(12) United States Patent
DiDonato et al.

(10) Patent No.: US 7,021,498 B2
(45) Date of Patent: Apr. 4, 2006

(54) URETHANE SPRAY GUN ASSEMBLY

(75) Inventors: Sante DiDonato, Chatham (CA); Brent Robert Gawne, Tupperville (CA)

(73) Assignee: Advanced Controls and Engineering, Chatham (CA)

(*) Notice: Subject to any disclaimer, the term of this patent is extended or adjusted under 35 U.S.C. 154(b) by 0 days.

(21) Appl. No.: 10/818,576

(22) Filed: Apr. 6, 2004

(65) Prior Publication Data
US 2005/0218155 A1 Oct. 6, 2005

(51) Int. Cl.
*B67D 5/52* (2006.01)

(52) U.S. Cl. .................. 222/136; 222/145.5; 222/318; 222/389

(58) Field of Classification Search ............... 222/136, 222/145.5, 145.6, 318, 334, 389
See application file for complete search history.

(56) References Cited

U.S. PATENT DOCUMENTS

| | | | | |
|---|---|---|---|---|
| 4,778,083 A * | 10/1988 | Decker | ........... | 222/144.5 |
| 4,867,346 A * | 9/1989 | Faye et al. | ........... | 222/145.2 |
| 4,913,317 A * | 4/1990 | Wernicke | ........... | 222/1 |
| 5,104,006 A * | 4/1992 | Brown | ........... | 222/145.1 |
| 5,163,584 A * | 11/1992 | Huber et al. | ........... | 222/1 |
| 5,180,082 A * | 1/1993 | Cherfane | ........... | 222/145.2 |
| 6,793,098 B1 * | 9/2004 | Huber et al. | ........... | 222/1 |

FOREIGN PATENT DOCUMENTS

| | | |
|---|---|---|
| CA | 2428087 | 9/2002 |
| EP | 0303305 | 2/1989 |
| EP | 0379246 | 7/1990 |
| EP | 0386818 | 9/1990 |
| EP | 0389014 | 9/1990 |
| EP | 0642411 | 11/1993 |
| EP | 0804327 | 12/1995 |
| EP | 0929586 | 4/1998 |
| EP | 1126958 | 4/2000 |
| EP | 1305189 | 2/2002 |
| EP | 1355776 | 2/2002 |
| EP | 1320451 | 2/2005 |
| KR | 1990-0014040 | 9/1990 |
| KR | 1988-0008615 | 11/1990 |
| KR | 1997-7003232 | 5/1997 |
| KR | 2001-0080892 | 12/2001 |
| WO | WO 2004/000905 A1 | 12/2003 |

* cited by examiner

*Primary Examiner*—Joseph A. Kaufman
(74) *Attorney, Agent, or Firm*—Gifford, Krass, Groh, Sprinkle, Anderson & Citkowski, P.C.

(57) ABSTRACT

A spray urethane gun assembly having a main body with a bore and a mixing chamber. An elongated spool is longitudinally, slidably mounted in the main body bore and movable between an extended position and a retracted position by an actuator. A first and a second inlet port are formed in the main body and a first and second outlet port are also formed in the main body. A first axially extending fluid passageway is formed in the spool and this first fluid passageway fluidly connects the first inlet port with the first outlet port when the spool is in one of the retracted or extended position, and fluidly connects the first inlet port with the mixing chamber when the spool is in the other of the retracted or extended position. A second axially extending passageway is formed in the spool and this second fluid passageway fluidly connects the second inlet port with the second outlet port when the spool is in one of its retracted or extended position, and fluidly connects the second inlet port with the mixing chamber when the spool is in the other of its retracted or extended position. A dispensing port formed in the main body is open to the mixing chamber for dispensing the fluid mixture within the mixing chamber.

20 Claims, 7 Drawing Sheets

URETHANE SPRAY GUN ASSEMBLY

BACKGROUND OF THE INVENTION

1. Field of the Invention

The present invention relates to spray gun assemblies for manufacturing polyurethane skin components.

2. Description of Related Art

Guns for spraying urethane are used in many different manufacturing applications, e.g. such as the manufacture of interior compartment components for automotive vehicles. These spray guns, when actuated, form a mixture of polyol and isocyanate and dispense the mixture through conventional dispensing means, such as a needle valve operated dispensing gun. In the well-known fashion, polyol and isocyanate, when combined, form a foam which rapidly cures into a flexible skin.

These previously known spray guns for urethane typically include a main body having a first port fluidly connected with a pressurized source of polyol, a second port fluidly connected with a pressurized source of isocyanate, and a third port for solvent. A first needle valve is fluidly connected in series with the first fluid port while, similarly, a second needle valve is fluidly connected in series with the second fluid port. These needle valves are movable between an open and a closed position. In their closed position, the needle valves prevent fluid flow of either the polyol or the isocyanate through the first and second ports, respectively. Conversely, when the needle valves are moved to their open positions, fluid flow of both the polyol as well as the isocyanate to the dispensing wand occurs.

These previously known guns for spraying urethane, however, have not proven wholly satisfactorily in use. One disadvantage of these previously known urethane spray guns is that, when the needle valves are moved to their open position, the polyol and isocyanate are directly fluidly connected with the dispensing wand. In some cases, inadequate intermixing of the polyol and the isocyanate results which, in turn, results in inadequate urethane foam production.

SUMMARY OF THE PRESENT INVENTION

The present invention provides a spray gun for urethane which overcomes all of the above-mentioned disadvantages of the previously known devices.

In brief, the urethane spray gun of the present invention comprises a main body having a bore and a mixing chamber at one end of the body. An elongated spool is longitudinally slidably mounted within the bore in the main body and is movable between an extended and a retracted position. An actuator connected to the spool moves the spool between its retracted and its extended position and, preferably, the actuator is pneumatically or hydraulically operated.

A first inlet port and a second inlet port are formed on the main body. Similarly, a first outlet port and second outlet port are also formed on the main body.

In a first embodiment of the invention, a first axially extending fluid passageway is formed on the spool and this first fluid passageway fluidly connects the first inlet port with the first outlet port when the spool is in its retracted position. Conversely, the first inlet passageway fluidly connects the first inlet port with the mixing chamber when the spool is in its extended position.

A second axially extending fluid passageway is also formed on the spool. The second fluid passageway fluidly connects the second inlet port with the second outlet port when the spool is in its retracted position. When the spool is moved to its extended position, the second fluid passageway fluidly connects the second inlet port with the mixing chamber in the main body.

A dispensing port is also formed on the housing and open to the mixing chamber. Any conventional means, such as a wand having a throughbore, is fluidly connected to the dispensing chamber so that the fluid in the mixing chamber flows out through the wand.

In use, the first fluid port is fluidly connected to a source of pressurized polyol while the first outlet port is fluidly connected to the source of polyol at a lower pressure. Similarly, a pressurized source of isocyanate is fluidly connected to the second inlet port while the second outlet port is fluidly connected to the source of isocyanate at a lower pressure.

Consequently, when the spool is in its retracted position, the polyol circulates through the first inlet, first passageway, and first outlet while, simultaneously, the isocyanate circulates through the second inlet, second passageway and second outlet back to the source of isocyanate. Conversely, when the spool is moved to its extended position, the first and second spool passageways respectively fluidly connect the pressurized source of polyol and the pressurized source of isocyanate to the mixing chamber. The polyol and isocyanate pre-mix within the mixing chamber and the resulting mixture is then dispensed through the dispensing wand.

Optionally, the main body includes a third inlet port and a third outlet port which cooperate with a third fluid passageway formed in the spool. A pressurized source of a colorant is then fluidly connected to the third inlet port while the third outlet port is fluidly connected to the colorant source at a lower pressure.

Since the polyol, isocyanate and, optionally, colorant continuously circulate through the main body of the spray gun between dispensing operations, the spray gun is maintained at the temperature of the polyol and isocyanate thus eliminating, or at least minimizing, the possibility of thermal shock at the initiation of a dispensing operation. Similarly, since the polyol, isocyanate, and, optionally, colorant are pre-mixed in the mixing chamber prior to dispensing through the wand, a uniform mix of the polyol, isocyanate, and, optionally, colorant is ensured.

In a second embodiment of the invention, the movement of the spool is reversed. Consequently, dispensing occurs when the spool is moved to a retracted position while dispensing occurs when the spool is moved to an extended position.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
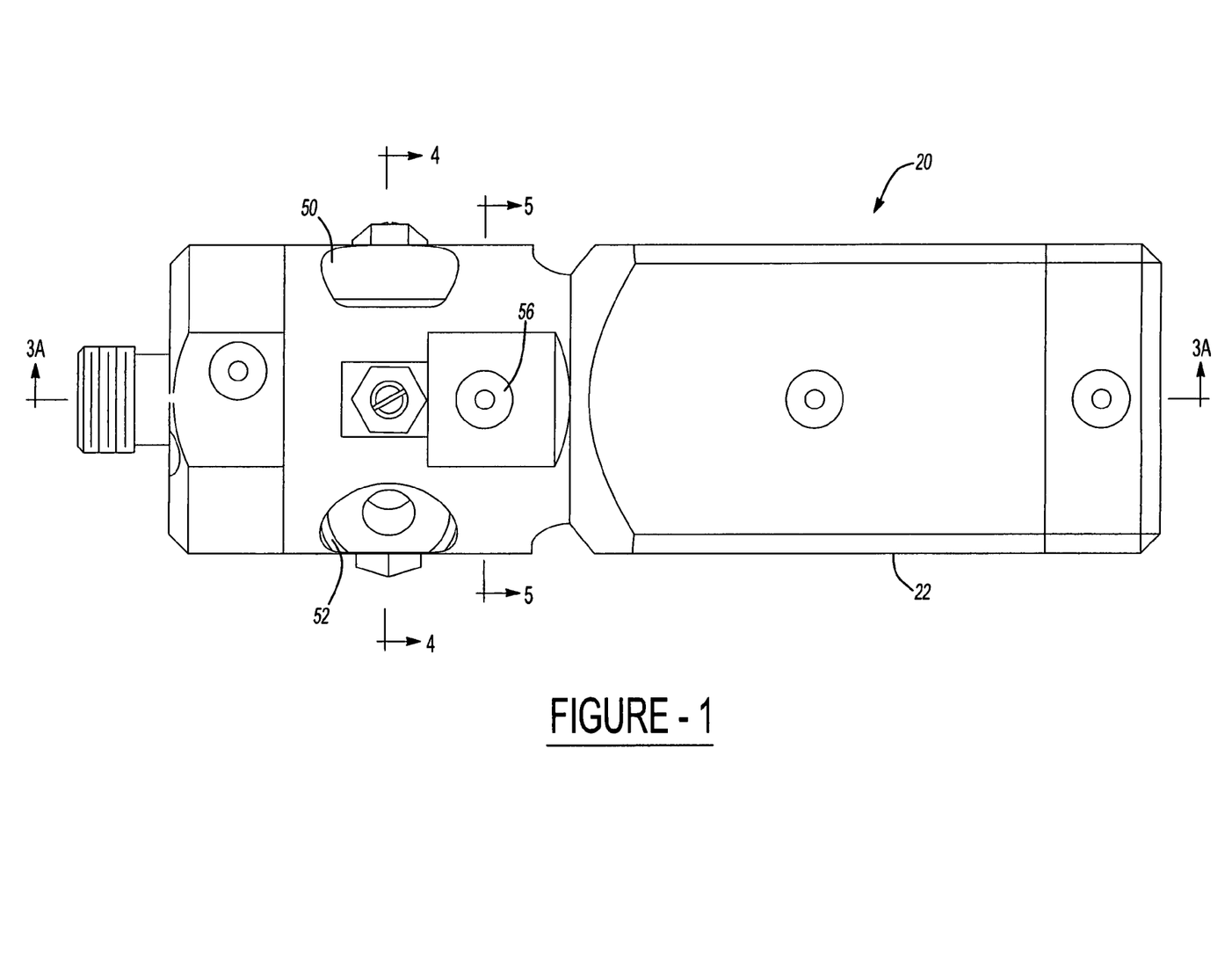
FIG. 1 is a plan view of a preferred embodiment of the invention.
Figure 3A:
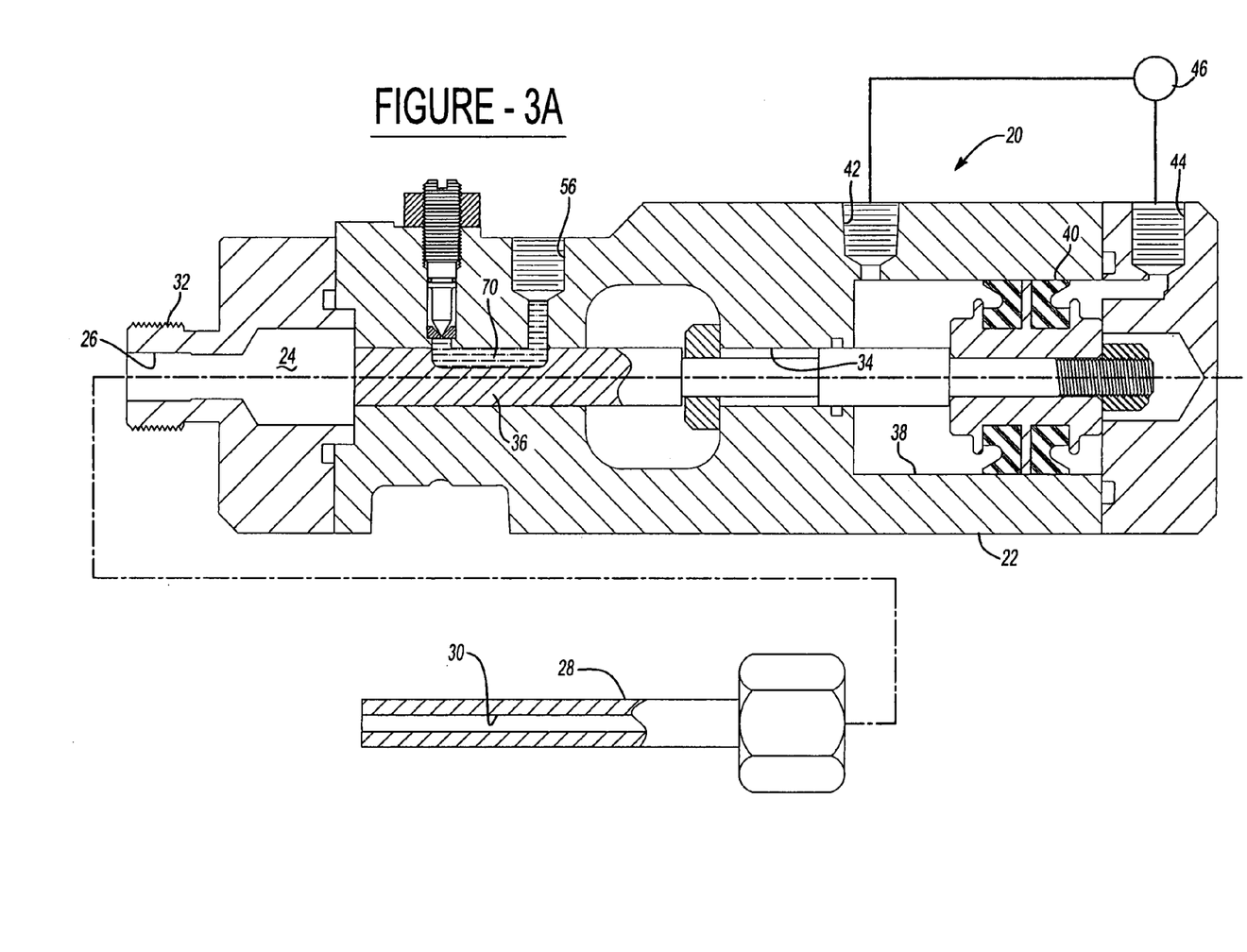
FIG. 3A is a sectional view taken along line 3A—3A in FIG. 1 and showing the spool in a retracted position.

With reference first to FIGS. 1 and 3A, a preferred embodiment of the spray gun assembly 20 is shown and comprises an elongated and generally cylindrical main body 22. A mixing chamber 24 is formed within the main body 22 at one end of the main body 22. A dispensing port 26 on the main body 22 is fluidly open to the mixing chamber 24.

A dispensing wand 28 having a throughbore 30 has one end detachably connected to the port 26 so that the passageway 30 is fluidly connected in series with the mixing chamber 24. Although any conventional means may be used to attach the wand 28 to the dispensing port 26, preferably a threaded connection 32 between the main body 22 and the wand 28 detachably connects the wand 28 to the main body 22 thus enabling different wands 28 to be used with the main body 22.

With reference now particularly to FIG. 3A, an elongated axially extending bore 34 is formed through the main body 22 so that one end of the bore 22 is open to the mixing chamber 24. An elongated spool 36 is axially slidably mounted within the bore 34 and is movable between a retracted position, illustrated in FIG. 3A, and an extended position, illustrated in FIG. 3B.

Although any conventional means may be used to displace the spool 36 between its extended position and its retracted position, in the preferred embodiment, the main body includes a piston chamber 38 at the end of the main body 22 opposite from the mixing chamber 24. A piston 40 is slidably disposed within the piston chamber 38 and is attached to the spool 36 so that the piston 40 and spool 36 move in unison with each other. A pair of actuator ports 42 and 44 formed in the main body 22 are fluidly connected with a pneumatic system 46 (illustrated only diagrammatically) which controls the pressurization at the pneumatic ports 42 and 44 and thus the position of the piston 40 within the piston chamber 38.

Figure 2:
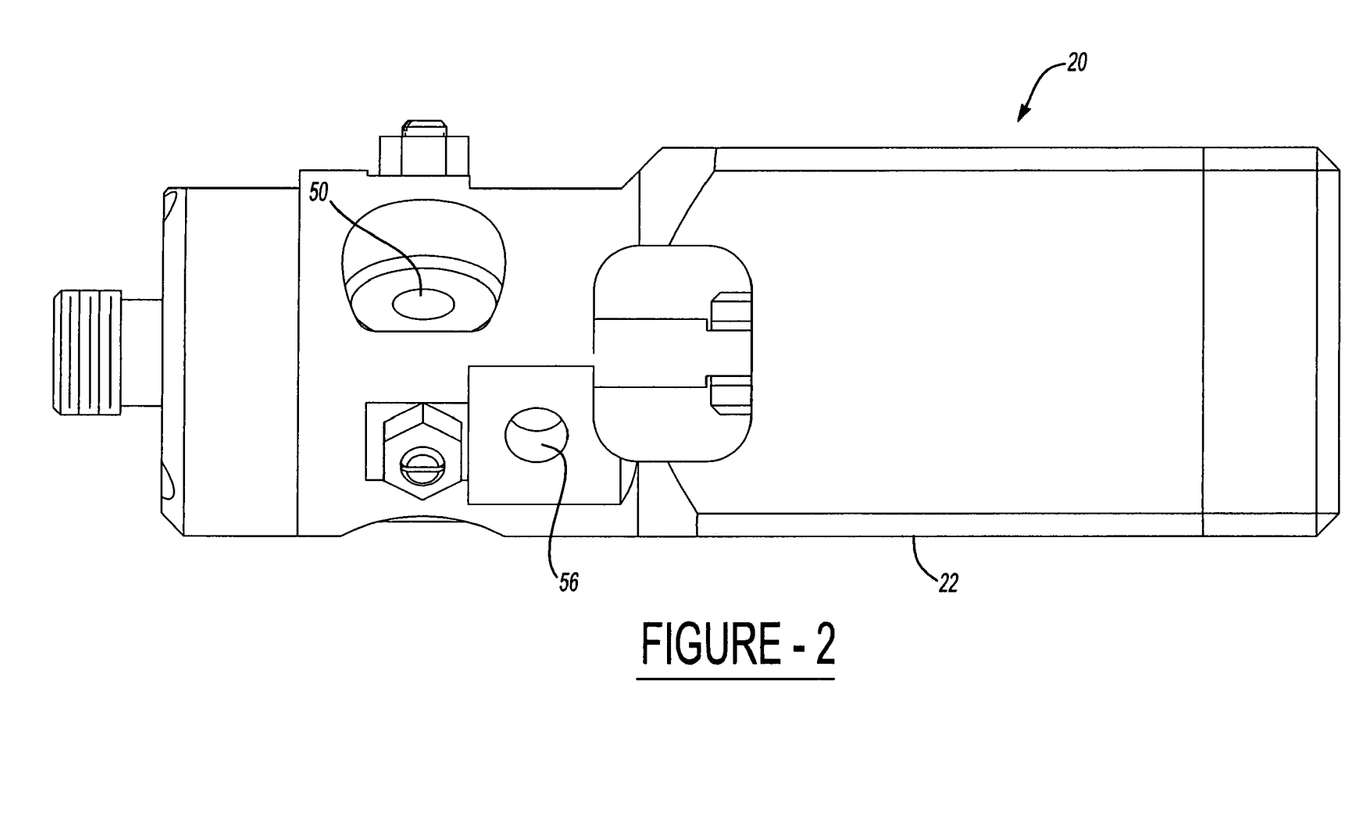
FIG. 2 is a plan view similar to FIG. 1, but at a different rotational angle.
Figure 4:
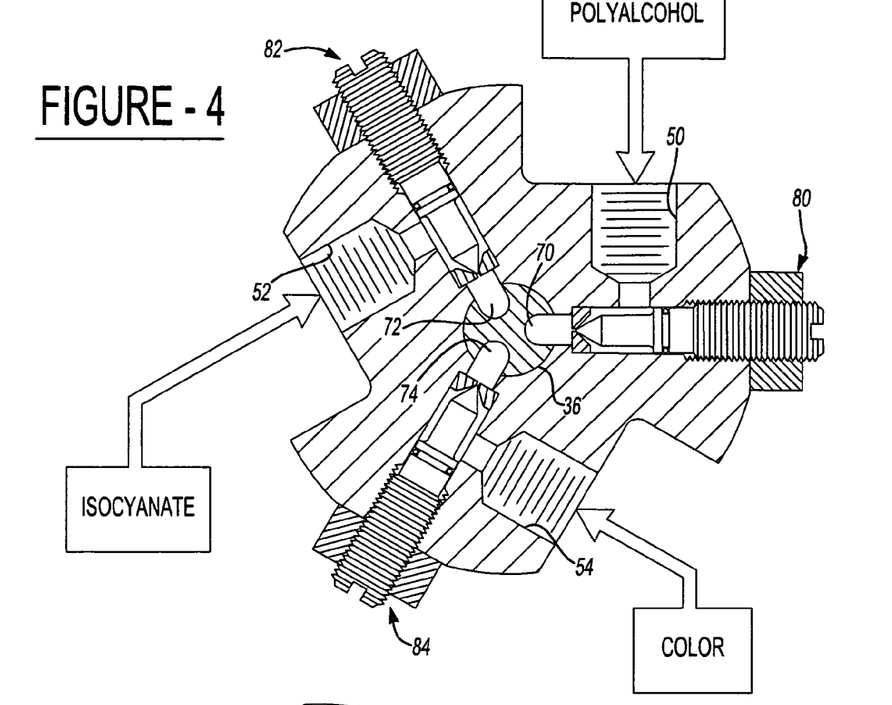
FIG. 4 is a sectional view taken along line 4—4 in FIG. 1 and enlarged for clarity.
Figure 5:
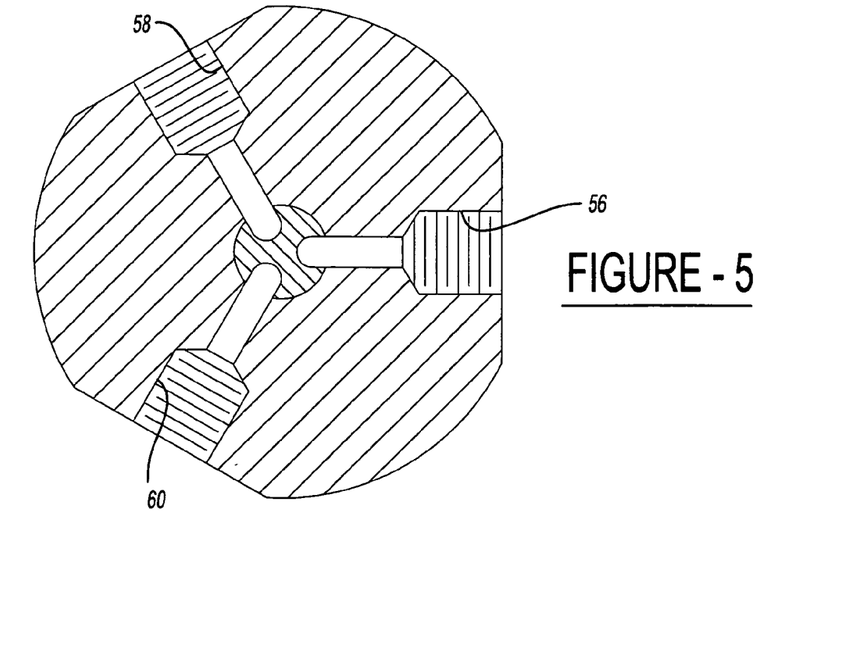
FIG. 5 is a sectional view taken along line 5—5 in FIG. 1 and enlarged for clarity.

With reference now particularly to FIGS. 1, 2 and 4, a first inlet port 50, a second inlet port 52 and, optionally, a third inlet port 54 are formed in the main body 22 so that the first inlet port 50, second inlet port 52 and third inlet port 54 are fluidly connected to the bore 34 in the main body 22. Similarly, as shown in FIG. 5, a first outlet port 56, second outlet port 58 and, optionally, third outlet port 60 are also formed in the main body 22. Each of the outlet ports 56, 58 and 60 are fluidly connected to the main body bore 34 such that the first, second and third outlet ports 56, 58 and 60 are axially spaced from the first, second and third inlet ports 50, 52 and 54, respectively.

With reference now particularly to FIGS. 3A and 4, a first axially extending passageway 70 in the spool 36 fluidly connects the first inlet port 50 with the first outlet port 56 when the spool 36 is in its retracted position (FIG. 3A). Similarly, a second axially extending passageway 72 (FIG. 4) and third axially extending passageway 74 in the spool 36 fluidly connect the second inlet port 52 with the second outlet port 58 and the third inlet port 54 with the third outlet port 60, respectively, when the spool 36 is in its retracted position.

Figure 3B:
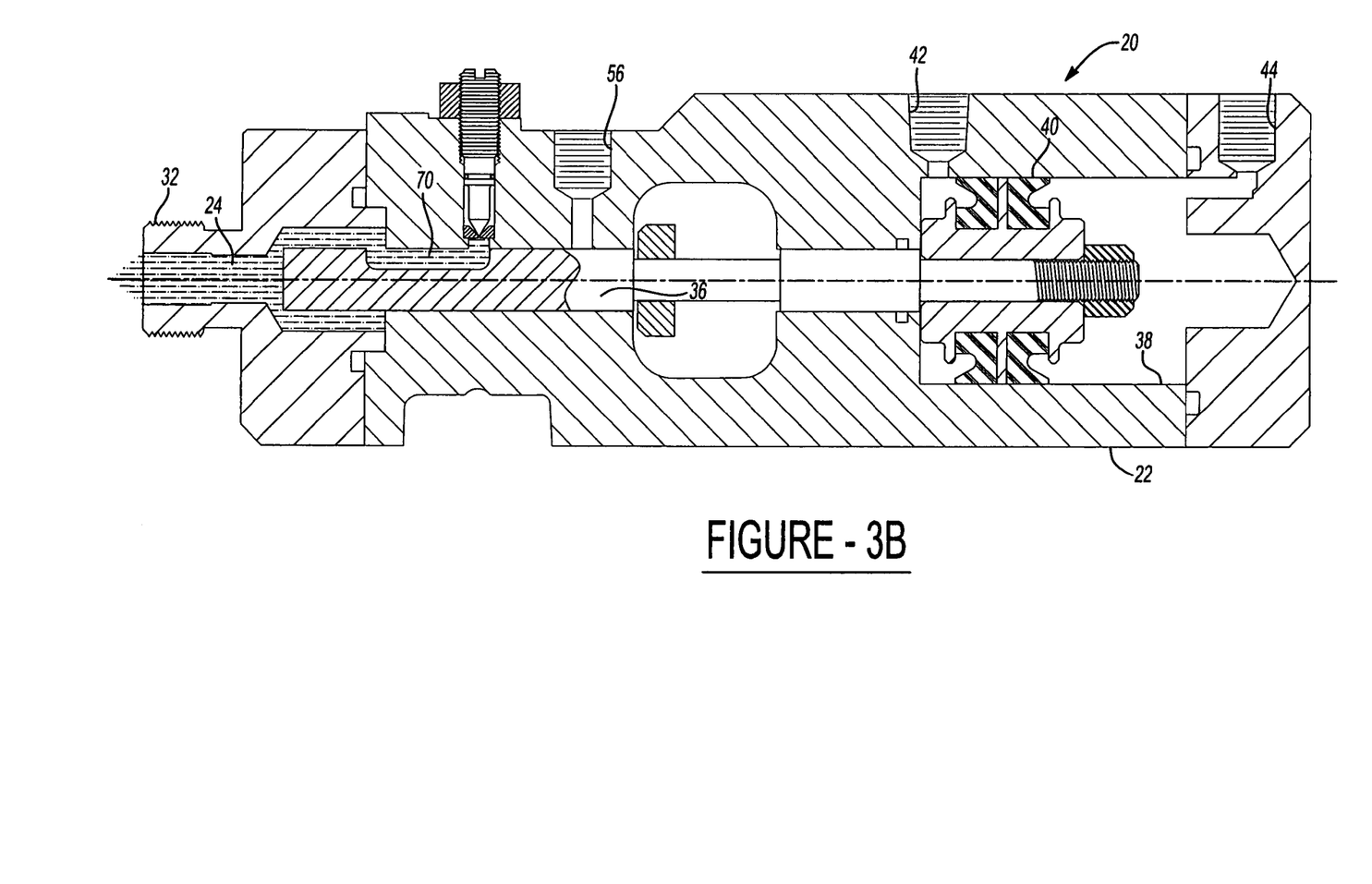
FIG. 3B is a sectional view similar to FIG. 3A, but showing the spool in an extended position.

Conversely, when the spool 36 is moved to its extended position, illustrated in FIG. 3B, the first, second and third spool passageways 70, 72 and 74, respectively, fluidly connect the first, second and third inlet ports, 50, 52 and 54, respectively, to the mixing chamber 24.

Preferably and with reference to FIG. 4, a first metering valve 80 is fluidly connected in series between the first port 50 and the bore 34 in the main body 22. Similarly, a second metering valve 82 is fluidly connected in series between the second inlet port and the main body bore 34 while a third metering valve 84 is fluidly connected in series between the third inlet port 54 and the main body bore 34. Each metering valve 80, 82 and 84 is conventional in construction and variably restricts the fluid flow through its associated inlet port.

Figure 6:
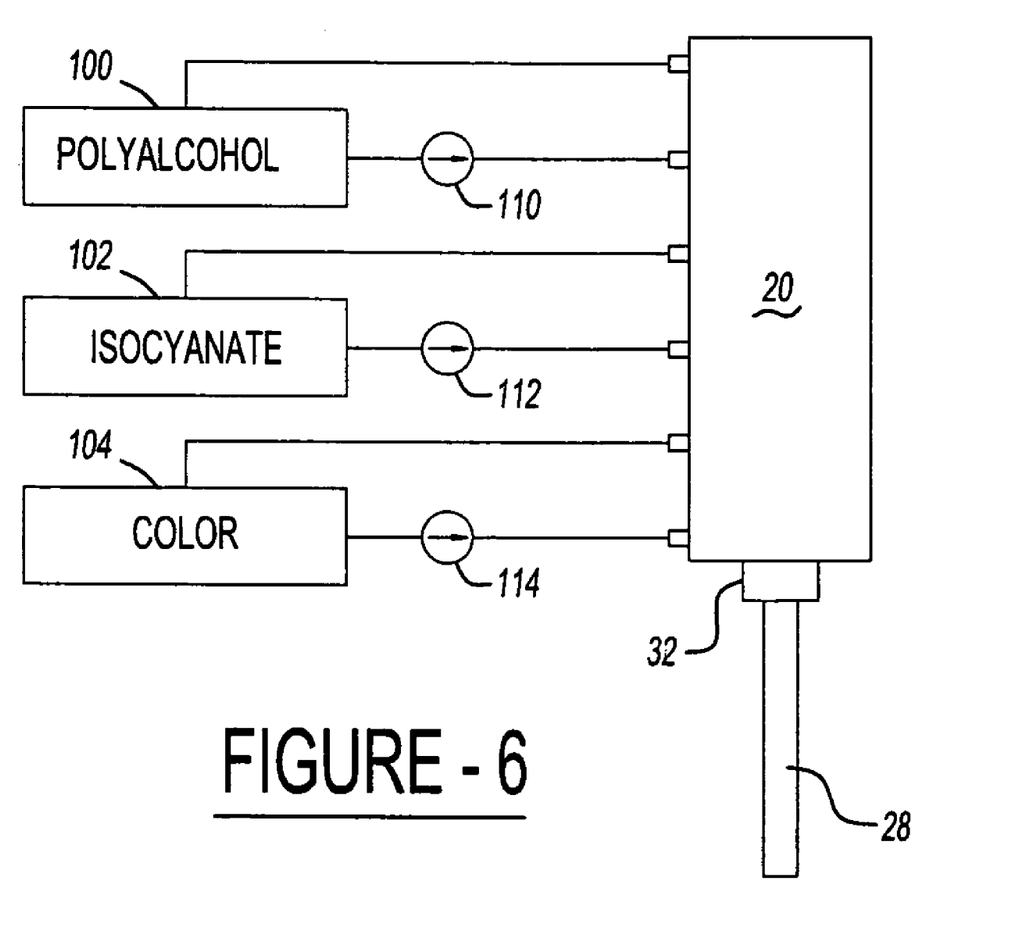
FIG. 6 is a diagrammatic view illustrating the present invention as used in a system.

With reference now to FIG. 6, a spray urethane system utilizing the gun 20 of the present invention is illustrated diagrammatically and includes a source 100 of polyol, a source 102 of isocyanate, and, optionally, a source 104 of a colorant. The polyol from the source 100 is pressurized by a pump 110 having its outlet fluidly connected with the first inlet port 50. The first outlet port 56 is then fluidly connected the source of polyol upstream from the pump 110.

Similarly, the source of isocyanate is pressurized by a pump 112 having its outlet connected to the second inlet port 52. The second outlet port 58 is then fluidly connected to the source 102 of isocyanate upstream from the pump 112.

Similarly, a pump 114 has its inlet connected to the source of colorant 104 and its outlet connected to the third inlet port 54. The third outlet port 60 is then fluidly connected to the source 104 of colorant upstream from the pump 114.

In operation, and assuming that the spool 36 is in its retracted position (FIG. 3A), the pump 110 continuously circulates polyol from the source 100 from the first inlet port 50, through the first spool passageway 70 and back to the polyol source 100. Similarly, the pump 112 continuously circulates the isocyanate through the second inlet port 52, second spool passageway 72 and second outlet port 58 back to the source 102 of isocyanate. Likewise, the pump 114 continuously circulates the colorant from the source 104 through the third inlet port 56, third spool passageway 74 and third outlet 60 back to the source of colorant 104.

Conversely, when the spool 36 is moved to its extended position (FIG. 3B), the first, second and third spool passageways 70, 72 and 74, respectively, fluidly connect the first, second and third inlet ports 50, 52 and 54 to the mixing chamber 24. The mixing chamber 24 thus ensures a complete mixture of the polyol, isocyanate, and, optionally, the colorant prior to the dispensing of the mixture from the mixing chamber 24 out through the dispensing wand 28.

By continuously re-circulating the polyol, isocyanate and colorant through their respective inlet and outlet ports on the main body 22, the spool 36 and main body 22, at least adjacent the mixing chamber 24, are maintained at substantially the same temperature as the polyol, isocyanate and colorant. In doing so, thermal shock of the mixture upon activation of the spray gun is effectively eliminated.

Figure 7:
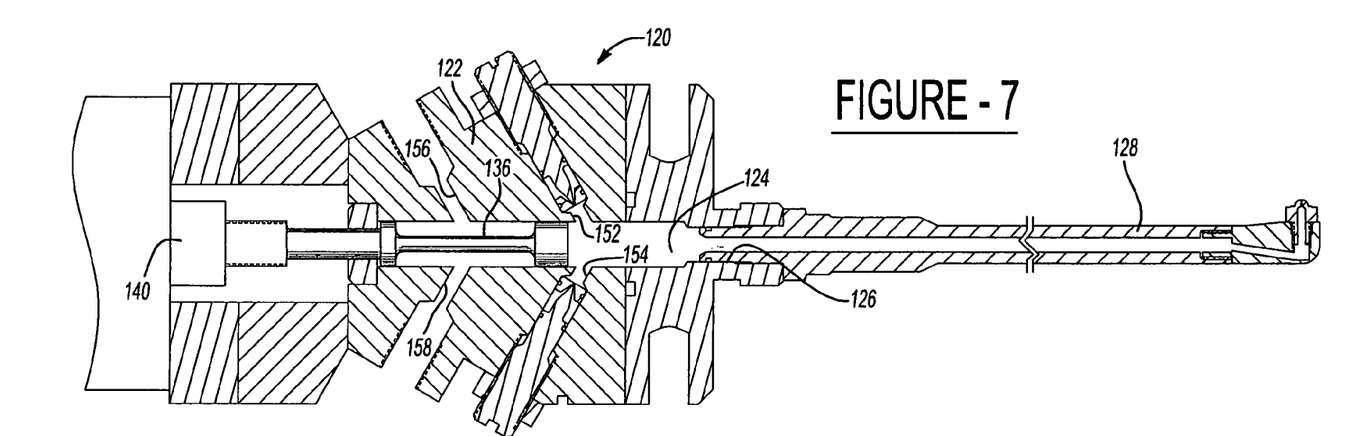
FIG. 7 is a view similar to FIG. 3B, but illustrates a second preferred embodiment of the invention.
Figure 8:
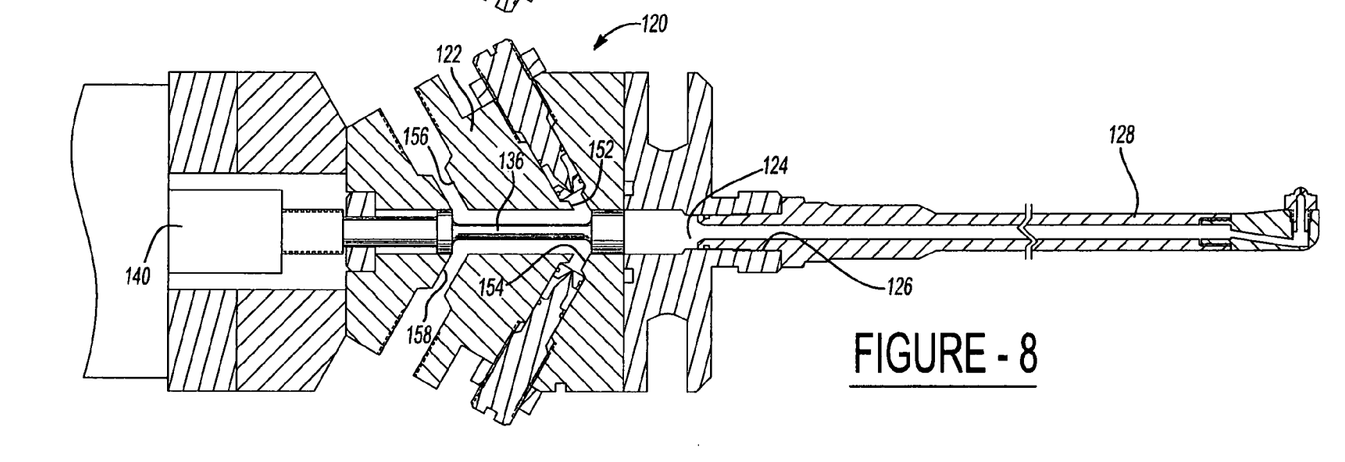
FIG. 8 is a view similar to FIG. 3A, but illustrates the second preferred embodiment of the invention.

With reference now to FIGS. 7 and 8, a second preferred embodiment of a spray gun 120 of the present invention is shown. The spray gun 120 includes an elongated main body 122 having a mixing chamber 124 formed at one end. A dispensing wand 128 is connected to one end of the main body 122 and is fluidly connected to the dispensing wand through a port 126.

A spool 136 is mounted within a bore 134 in the main body 122 and is movable between a retracted position, illustrated in FIG. 7, and an extended position, illustrated in FIG. 8. A piston 140 controls the actuation of the spool 136 and may be operated by any conventional means, such as hydraulically, pneumatically or the like.

Two inlet ports 152 and 154 in the main body 122 are fluidly connected to pressurized sources of polyol and isocyanate while a third port in the housing (not shown) is connected to a pressurized source of solvent. When the spool 136 is moved to its retracted position (FIG. 7), the spool fluidly connects these ports 152 and 154 to the mixing chamber 124. Conversely, when the spool 136 is moved to its extended position, the spool fluidly connects the ports 152 and 154 to their respective recirculation ports 156 and 158.

Consequently, the second embodiment of the spray gun 120 is substantially identical to the first described embodiment of the spray gun 20 (FIGS. 1–6) except that the operation of the spool is reversed, i.e. the gun 120 dispenses the mixture when the spool 136 is retracted and recirculates the isocyanate, polyol and solvent when the spool 136 is extended. Therefore, a detailed description of the individual components of the spray gun is unnecessary since a full description of these components has already been set forth and is incorporated by reference.

Preferably the droplet size from the spray gun is less than 100 microns.

From the foregoing, it can be seen that the present invention provides a simple and yet highly effective spray gun for urethane. Having described our invention, however, many modifications thereto will become apparent to those skilled in the art to which it pertains without deviation from the spirit of the invention as defined by the scope of the appended claims.

We claim:

1. A spray urethane gun assembly comprising:
   a main body having a bore and a mixing chamber,
   an elongated spool longitudinally slidably mounted in said main body bore and movable between an extended position and a retracted position,
   an actuator for moving said spool between said extended position and said retracted position,
   a first and second inlet ports formed in said main body,
   a first and a second outlet ports formed in said main body,
   wherein said first inlet and first outlet are adapted to be connected with a source of polyol and wherein said second inlet and said second outlet are adapted to be connected with a source of isocyanate,
   a first axially extending fluid passageway formed in said spool, said first fluid passageway fluidly connecting said first inlet port with said first outlet port when said spool is in one of said retracted position or extended to thereby recirculate polyol to said polyol source, and said first fluid passageway fluidly connecting said first inlet port with said mixing chamber when said spool is in the other of said retracted or extended position,
   a second axially extending fluid passageway formed in said spool, said second fluid passageway fluidly connecting said second inlet port with said second outlet port when said spool is in said one of said retracted or extended position to thereby recirculate isocyanate to said isocyanate source, and said second fluid passageway fluidly connecting said second inlet port with said mixing chamber when said spool is in said other of said retracted or extended position, and
   a dispensing port formed in said main body and open to said mixing chamber.

2. The invention as defined in claim 1 and comprising a metering valve fluidly connected between said first inlet port and said first fluid passageway.

3. The invention as defined in claim 1 and comprising a metering valve fluidly connected between said second inlet port and said second fluid passageway.

4. The invention as defined in claim 1 wherein said actuator comprises a pneumatic actuator.

5. The invention as defined in claim 4 and comprising a piston chamber formed in said main body, a piston axially slidably mounted in said piston chamber, a first and second pneumatic port formed in said main body, said first and second pneumatic ports being open to said piston chamber on opposite ends of said piston, and said piston being mechanically connected to said spool.

6. The invention as defined in claim 5 wherein said piston is attached to said spool and moves in unison with said spool.

7. The invention as defined in claim 1 and comprises a dispensing wand having a through passageway, one end of said wand through passageway being fluidly connected to said dispensing port.

8. The invention as defined in claim 7 and comprising means for detachably securing said wand to said main body.

9. The invention as defined in claim 8 wherein said securing means comprises a threaded connection.

10. The invention as defined in claim 1 and comprising:
    a third inlet port formed in said main body,
    a third outlet port formed in said main body,
    a third axially extending fluid passageway formed in said spool, said third fluid passageway fluidly connecting said third inlet port with said third outlet port when said spool is in said one of said retracted or extended position, and said third fluid passageway fluidly connecting said third inlet port with said mixing chamber when said spool is in said other of said retracted or extended position.

11. A spray urethane system comprising:
    a spray gun assembly having a main body, said main body having a bore and a mixing chamber,
    an elongated spool longitudinally slidably mounted in said main body bore and movable between an extended position and a retracted position,
    an actuator for moving said spool between said extended position and said retracted position,
    a first and second inlet ports formed in said main body,
    a first and a second outlet ports formed in said main body,
    a source of pressurized polyol fluidly connected to said first inlet port, said first outlet port being fluidly connected to said source of polyol,
    a source of pressurized isocyanate fluidly connected to said second inlet port, said second outlet port being fluidly connected to said source of isocyanate,
    a first axially extending fluid passageway formed in said spool, said first fluid passageway fluidly connecting said first inlet port with said first outlet port when said spool is in one of said retracted or extended position to thereby recirculate polyol to said polyol source, and said first fluid passageway fluidly connecting said first inlet port with said mixing chamber when said spool is in the other of said retracted or extended position,
    a second axially extending fluid passageway formed in said spool, said second fluid passageway fluidly connecting said second inlet port with said second outlet port when said spool is in said one of said retracted or extended position to thereby recirculate isocyanate to said isocyanate source, and said second fluid passageway fluidly connecting said second inlet port with said mixing chamber when said spool is in said other of said retracted or extended position, and a dispensing port formed in said main body and open to said mixing chamber.

12. The invention as defined in claim 11 and comprising a metering valve fluidly connected between said first inlet port and said first fluid passageway.

13. The invention as defined in claim 11 and comprising a metering valve fluidly connected between said second inlet port and said second fluid passageway.

14. The invention as defined in claim 11 wherein said actuator comprises a pneumatic actuator.

15. The invention as defined in claim 14 and comprising a piston chamber formed in said main body, a piston axially slidably mounted in said piston chamber, a first and second pneumatic port formed in said main body, said first and second pneumatic ports being open to said piston chamber on opposite ends of said piston, and said piston being mechanically connected to said spool.

16. The invention as defined in claim 15 wherein said piston is attached to said spool and moves in unison with said spool.

17. The invention as defined in claim 11 and comprises a dispensing wand having a through passageway, one end of said wand through passageway being fluidly connected to said dispensing port.

18. The invention as defined in claim 17 and comprising means for detachably securing said wand to said main body.

19. The invention as defined in claim 18 wherein said securing means comprises a threaded connection.

20. The invention as defined in claim 11 and comprising:
a third inlet port formed in said main body,
a third outlet port formed in said main body,
a third axially extending fluid passageway formed in said spool, said third fluid passageway fluidly connecting said third inlet port with said third outlet port when said spool is in said one of said retracted or extended position, and said third fluid passageway fluidly connecting said third inlet port with said mixing chamber when said spool is in said other of said retracted or extended position, and
a source of pressurized colorant fluidly connected to said third inlet port, said third outlet port being fluidly connected to said source of colorant.

* * * * *